(12) United States Patent
Kuntze et al.

(10) Patent No.: US 6,854,529 B2
(45) Date of Patent: Feb. 15, 2005

(54) OPTIMIZING METHOD FOR REGULATING THE OPERATING STATE OF A GUIDED MACHINE TOOL COMPRISING A ROTATING PERCUSSION TOOL DURING A BORING PROCESS

(75) Inventors: Helge-Björn Kuntze, Stutensee (DE); Christian Frey, Karlsruhe (DE); Andreas Jacubasch, Karlsruhe (DE); Reinhard Plietsch, Brechen/Niederbechen (DE)

(73) Assignees: Fraunhofer-Gesellschaft zur Forderung der angewandten Forschung e.V., Munich (DE); Black & Decker, Newark, DE (US)

( * ) Notice: Subject to any disclaimer, the term of this patent is extended or adjusted under 35 U.S.C. 154(b) by 0 days.

(21) Appl. No.: 10/362,937

(22) PCT Filed: Aug. 30, 2001

(86) PCT No.: PCT/EP01/10018

§ 371 (c)(1),
(2), (4) Date: Sep. 2, 2003

(87) PCT Pub. No.: WO00/19048

PCT Pub. Date: Mar. 7, 2002

(65) Prior Publication Data

US 2004/0049311 A1 Mar. 11, 2004

(30) Foreign Application Priority Data

Sep. 1, 2000 (GB) .............................................. 0021368
Aug. 1, 2001 (DE) ........................................ 101 37 736

(51) Int. Cl.$^7$ .............................................. E21B 3/06
(52) U.S. Cl. .............................. 173/1; 173/2; 173/176; 173/179; 175/27
(58) Field of Search .............................. 173/1, 2, 4, 11, 173/176, 179, 109; 175/24, 27; 364/474.19, 508

(56) References Cited

U.S. PATENT DOCUMENTS

| | | | | | |
|---|---|---|---|---|---|
| 3,823,784 | A | * | 7/1974 | Feucht | 173/1 |
| 4,246,973 | A | * | 1/1981 | Mayer | 173/8 |
| 4,271,914 | A | * | 6/1981 | Dressel | 173/158 |
| 5,131,475 | A | * | 7/1992 | Beney | 173/1 |
| 5,170,358 | A | * | 12/1992 | Delio | 700/177 |
| 5,289,885 | A | * | 3/1994 | Sakoh | 173/2 |
| 5,771,981 | A | * | 6/1998 | Briggs et al. | 173/4 |
| 5,913,371 | A | * | 6/1999 | Jenne | 175/27 |
| 6,505,689 | B1 | * | 1/2003 | Poysti et al. | 173/4 |
| 6,510,902 | B1 | * | 1/2003 | Prokop et al. | 173/1 |

* cited by examiner

Primary Examiner—Scott A. Smith
(74) Attorney, Agent, or Firm—Antonelli, Terry, Stout & Kraus, LLP

(57) ABSTRACT

Disclosed is an optimizing method for regulating the operating state of a guided machine tool having a tool rotating at a certain speed and subjected to a percussion frequency during a boring action, in which the tool, subjected in addition to a force, is driven into an object of a given material. The method includes, determination of the parameters characterizing the actual operating state of the machine tool; conduction of an adaptive process analysis based on the determined parameters in order to obtain parameter-specific, relevant characteristics; evaluation of the parameter-specific, relevant characteristics within the framework of a logical decision-making process in order to obtain information characterizing the actual operating state; selection of known reference data of the utilized tool describing the operating state and of the to-be-machined material according to a given quality criterion; determination of an optimum operating point for the machine tool determinable by the rotational speed and percussion frequency by comparison of the information characterizing the actual operating state with the selected reference data; and regulation of the machine tool regarding the rotational speed and percussion frequency based on the determined optimum operating point.

17 Claims, 2 Drawing Sheets

Figure 1:
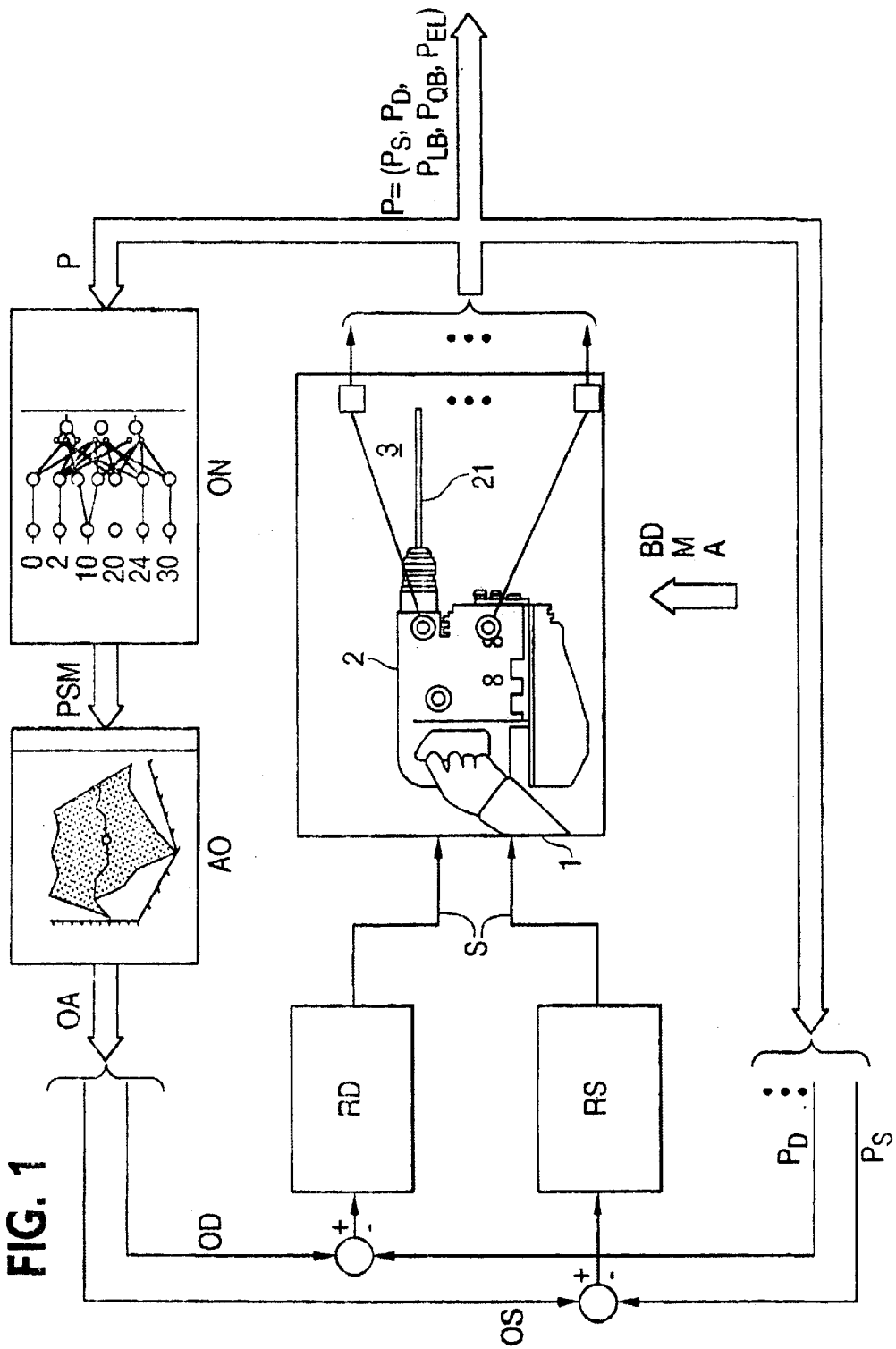

OPTIMIZING METHOD FOR REGULATING THE OPERATING STATE OF A GUIDED MACHINE TOOL COMPRISING A ROTATING PERCUSSION TOOL DURING A BORING PROCESS

BACKGROUND OF THE INVENTION

1. Field of the Invention

The present invention relates to an optimizing method for regulating the operating state of a guided machine tool having a tool rotating at a certain speed and subjected to a percussion frequency during a boring process, in which the tool, subjected in addition to a force, is driven into an object consisting of a given material.

2. Description of the Prior Art

Machine tools of the above-mentioned type are, in particular, percussion drilling machines provided with a fastening mechanism designed as a drill chuck into which a boring tool can be firmly and detachably inserted, can be set into rotation and, moreover, is subjected to mechanically induced impacts in the longitudinal direction of the drilling tool. In most cases, percussion drilling machines are provided with a single drive motor serving for the drill's rotation drive as well as for the percussion drive with the aid of a suited gear. Percussion drilling machines of this type which only have a single drive motor, however, are not suited for setting the rotational speed and the percussion frequency singly and independent of each other as desired. It is this capability of independent setting of rotational speed and percussion frequency that fundamentally permits optimum adaptation of both the operating parameters to the current drill situation respectively the operating situation of the percussion drilling machine, which is substantially influenced by the type of bit selected as well as by the hardness of the to-be-machined material respectively the hardness of the stone.

Goal of each drilling is to obtain drilling action with minimal guidance force and minimal back-kick force but at the same time with maximum achievable boring speed.

Fundamentally, the drilling action is based on a mechanical multi-body system having a robot respectively a human being holding and guiding the percussion drilling machine, the drill itself and the to-be-machined stone respectively to-be-machined material. All three components interact with each other. This interaction is essentially influenced by the rotational speed and the percussion frequency of the percussion drilling machine. If changes are made to the percussion machine or changes occur to the object to be machined with the percussion drilling machine, these changes inevitably result in disturbing the afore-described three-body system, which usually effects the overall drilling action negatively.

SUMMARY OF THE INVENTION

The object of the present invention is to provide an optimizing method for regulating the operating state of a guided machine tool, preferably a percussion drilling machine having a tool, preferably a boring tool, rotating at a certain speed and subjected to a percussion frequency during a boring process in which the boring tool, subjected in addition to a force, is driven into an object consisting of a given material, in such a manner that optimum boring action, even if the boring conditions change during the boring action, such as for example a change in the hardness of the material of the to-be-bored object, is ensured during the boring process, preferably during the entire boring process. The optimizing method should, in particular, permit individual tuning of the rotational speed and the percussion frequency with which the boring tool is driven into the object.

The solution of the present invention to the object thereof is set forth in claim 1. Advantageous features for further developing the inventive idea are indicated by the subject matter of the subclaims and the description of the invention.

An element of the present invention is that the optimizing method for regulating the operating state of a guided machine tool, preferably a percussion drilling machine having a tool rotating at a certain speed and subjected to a percussion frequency during the boring process in which the tool, subjected in addition to force, is driven into an object consisting of a given material has the following method steps:

First the parameters characterizing the actual operating state of the machine tool, obtained in the form of measuring signals, are detected by means of sensors. These measuring signals are subsequently subjected to an adaptive process analysis by means of which the relevant signal characteristics, so-called parameter-specific, relevant characteristics, are gained from the measuring signals of each individual sensor. It is these parameter-specific, relevant characteristics that are subsequently evaluated in the framework of a logical decision-making process in order to obtain information characterizing the actual operating state. This information characterizing the actual operating state contains among other things information about the currently employed boring tool as well as information about the currently machined material, in particular, the hardness of the material, for example of a rock.

On the basis of this information characterizing the actual operating state, discrete selection of known reference data describing the operating state is conducted. These reference data are available, for example, in the form of non-linear families of characteristic curves as the function of the rotational speed and the percussion frequency and have been determined by means of series of empirical tests using a variety of boring tools on different to-be-machined materials according to a given quality criterion. Quality criteria may be, for example, the requirement to achieve a borehole in the shortest possible time with minimum energy consumption or boring a hole in the shortest possible time, ignoring energy consumption. Finally an optimum operating point for the percussion drilling machine defined by the rotational speed and percussion frequency is determined by comparing the information characterizing the actual operating state with the detected selected reference data. If a deviation between the current rotational speed and percussion frequency and the determined optimum operating point is detected, respective readjustment is carried out.

Using fuzzy-based or neuro-fuzzy based methods is especially suited both for conducting the adaptive process analysis for obtaining the parameter-specific, relevant information and for conducting the decision-making process for obtaining information characterizing the actual operating state.

Figure 2:
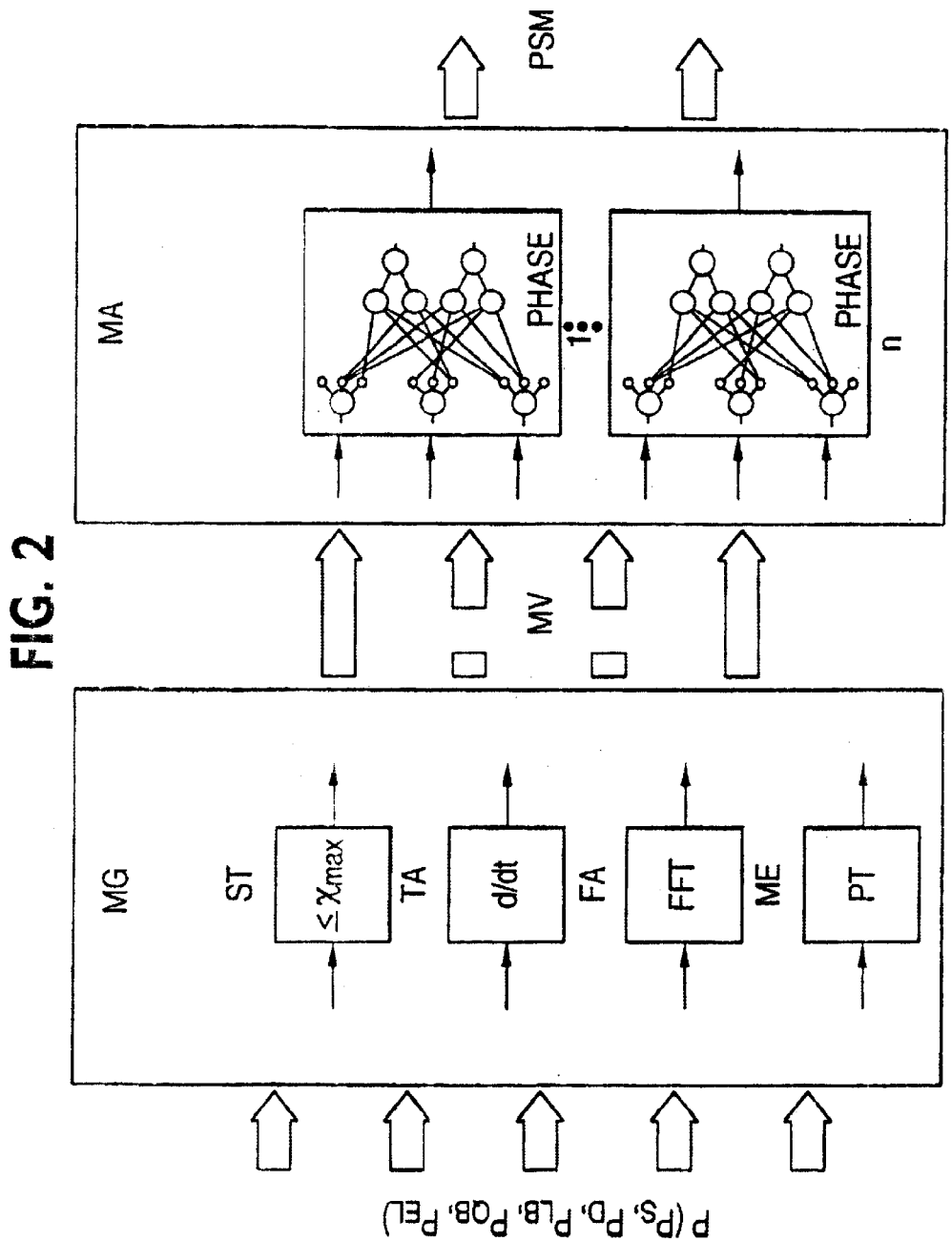

The invented optimizing method is made more apparent in FIGS. 1 and 2, which each show the process diagrams on which the invented optimizing method is based.

FIG. 1 shows a boring situation (center image), in which a person 1 is conducting a boring process on a wall 3 with the aid of a percussion drilling machine 2. As an alternative to an human operator operating the percussion drilling machine 2, a motion automaton, for example a robot, can also guide the percussion drilling machine 2 and the connected boring tool 21, subjected to a force, against the wall 3. Preferably, the percussion drilling machine 2 is provided with two separate drives, of which one sets the boring tool 21 into rotation and the other drive, preferably using an eccentric mechanism, subjects the boring tool 21 to pulsed impacts in the boring direction (see arrows), thereby enhancing boring progress in the boring direction. Thus both drives can be set and adjusted independent of each other.

On the basis of the afore-described boring situation depicted in FIG. 1, in a first step the parameter P characterizing the actual operating state of the percussion drilling machine is detected. This occurs using suited measuring sensors that are attached to respectively in the percussion drilling machine at a suited site and are suited for measuring accelerations, forces acting on the device, electric currents, rotational speeds, etc.

This particularly relates to providing sensors with which, among other things, the percussion frequency $P_S$, the rotational speed $P_D$, the longitudinal and the transverse acceleration $P_{LB}$, $P_{QB}$ acting on the boring tool 21 respectively on the percussion drilling machine 2 as well as to the electric power $P_{EL}$ consumed by the drilling machine 2, can be measured.

Based on the parameters P, i.e. $P_S$, $P_D$, $P_{LB}$, $P_{QB}$, $P_{EL}$, characterizing the actual operating state of the percussion drilling machine, an adaptive on-line diagnosis ON is conducted on the basis of these parameters P whose goal is to determine and give the current operating state of the percussion drilling machine during the boring process, stating the type of drill bit BD and the type of material M currently used respectively being machined. Fundamentally the selection respectively the recommendation of the type of drill bit BD and the type of rock respectively material are to be considered input parameters or even given state variables, yielding the respective boring action. The current pressing force A with which the percussion drilling machine is pressed against the wall 3 is also proportionally responsible for boring success. Preferably, the input variable A is also obtained as a result of the adaptive on-line diagnosis.

In detail, the on-line diagnosis ON occurs in two successive steps, shown in detail in FIG. 2, in such a manner that in the first step MG, the parameters P characterizing the actual operating state of the percussion drilling machine present as sensor signals are fed to an adaptive process analysis within the framework of a characteristic generation MG in which the individual parameters P present as sensor signals are provided as input data to a signal-based, model-based and/or knowledge-based process. The relevant signal characteristics are extracted from these data, for example using a threshold value test ST, trend analysis TA, frequency analysis FA and/or pattern recognition ME, which are then gathered in a characteristic vector MV whose dimensions are smaller respectively has less data capacity than the sensor signal(s) P provided at the outset.

In the adaptive process analysis utilized to obtain the parameter-specific, relevant characteristics, preferably so-called signal-based processes such as for example fuzzy-based limit value, trend and spectral analyses respectively wavelet analyses. Model-based processes, such as for example a Kalman filter or knowledge-based processes so-called expert systems may also be utilized for the adaptive process analysis.

The characteristic vector MV obtained with the aid of at least one of the aforementioned processes is fed in a second method step MA (characteristic analysis) within the on-line diagnosis ON to a logical decision-making process in which the quantitative variables are transformed into qualitative terms. For this purpose, characteristics-based pattern recognition methods based on fuzzy logic and neuronal networks are utilized. Such neuro-fuzzy based methods permit describing technical state variables using inexact linguistic qualitative information so that it is nonetheless possible to provide clear and precise information, despite inexact specific input values, about the probability with which the percussion drilling machine is in a concrete actual operating state, i.e. with what type of boring tool a certain type of material is being machined. Moreover, it is possible to let heuristic expertise flow into the logical decision-making process.

Furthermore, the aforementioned transformation of the single sensor signals P respectively signal characteristics MV into fuzzy linguistic variables (fuzzification) opens an attractive possibility of integrating physically completely different continuously or discretely acting sensors in a multi-sensor system.

Finally, information PSM characterizing the actual operating state of the percussion drilling machine is obtained with the aid of a logical decision-making process based on a neuro-fuzzy based method. This information PSM contains, among other things, concrete information about the currently used boring tool BD, the currently machined material M as well as preferably the currently prevailing pressure force A with which an operative is pressing the percussion drilling machine against the wall 3. The penetration depth, which the boring tool is currently penetrating the to-be-machined object, can also be derived from the information obtained in the described manner.

Thus the neuro-fuzzy based characteristics evaluation during the on-line diagnosis ON enables the percussion drilling machine to recognize its momentary operating state by itself.

However, in order to be able to check whether the percussion drilling machine is operating optimally at its operating point, which is defined by an optimum percussion frequency and an optimum rotational speed, first requires comparing the information PSM characterizing the actual operating state, the actual current rotational speed PD determined by measuring, with especially selected reference data RD, which are selected according to specific criteria from a present data storage.

Thus, a plurality of non-linear families of characteristic curves are to be determined in experiments by means of series of systematic tests with all the available boring tools and types of materials and stored in a suited form for each type of drill bit and rock. The individual families of characteristic curves are recorded as non-linear families of characteristic curves dependent on percussion frequency and rotational speed and stored accordingly. The families of characteristic curves serving as the reference data RD may preferably be provided as look-up tables.

From the plurality of available families of characteristic curves, that family of characteristics is selected and is used as the reference data RD that corresponds to the determined current boring tool and type of material of the to-be-machined material.

In order to be able to further determine the optimum operating point with regard to rotational speed and percussion frequency, the previously obtained information PSM characterizing the actual operating state is compared with the reference data RD present as a family of characteristic curves in the framework of an operating point optimizing step AO following the on-line diagnosis ON (see FIG. 1). The comparison serving the optimization contains a minimum respectively maximum value formation of the family of characteristic curves based on suited search respectively optimizing algorithms, the result of which finally represents an optimum percussion frequency and an optimum rotational speed. See, in particular, a paper by Coleman, Th., Branch, M-A and Grace, A.: "Optimization Toolbox for Use with MATLAB", User's Guide, Version 2, The Math Works Inc. 24 Prime Park Way, natick, Mass. 01760-1500 (USA), 1999.

With the aid of the optimum operating point OA determined in the aforedecribed manner, the optimum percussion frequency OS and optimum rotational speed OD are compared with the actually measured current sensor signals regarding percussion frequency $P_S$ and rotational speed $P_D$. This occurs in the most simple manner by corresponding subtraction of the optimum values OS and OD and the respectively measured signals $P_S$ and $P_D$. If a deviation is detected between the two comparison pairs, the percussion frequency respectively the rotational speed is readjusted with regard to the rotational speed respectively the percussion frequency by means of a respective control element $R_D$, $R_S$ and a downstream actuator S.

The invented optimization method can be realized with two separately triggerable electric drives on one percussion drilling machine without any additional arrangements. Any desired optimum percussion frequency respectively rotational speed can be set in these drives and sent as desired values in the two drive controls.

However, there are also prior art percussion drilling machines with only one drive in which a multi-step gear is utilized for decoupling the rotational speed and the percussion frequency in such a manner that the optimum operating point can be set by a desired rotational speed and a gear step respectively, with the optimum gear step, in contrast to the continuous setting of the rotational speed, being settable as discretely as possible.

In percussion drilling machines with only one drive and an infinitely variable PIV gear, the optimum operating point can be continuously set by means of a desired rotational speed and a gear step.

In conclusion, with regard to the invented optimizing method it can be stated that input variables, such as the diameter of the borehole, the hardness of the material and the pressing force, can be determined using multi-sensor on-line process diagnosis during the operation of a percussion boring device, which should always work with an optimum operating point, by means of active measurement of accelerations, forces, currents and rotational speeds using neuro-fuzzy based analysis methods. In this manner, the percussion drilling machine is enabled to recognize its current operating state, to optimally tune its operating point accordingly and thereby continuously afford maximum drilling progress respectively another quality criterion, such as for example minimum energy consumption or minimum arm strain. Peripheral physical conditions, such as energy consumption and performance limits of the percussion tools are, of course, taken into consideration.

The invented optimizing method is, however, not limited only to the percussion drilling machine described in the preceding, but rather can also be utilized in other guided, material-processing machine tools, such as for example in purely percussion hammers or boring devices, in which only one setting parameter, the rotational speed or percussion frequency respectively is to be optimally controlled separately. Robot-guided boring or percussion tools can also be actively readjusted.

What is claimed is:

1. An optimizing method for regulating the operating state of a manually guidable machine tool rotating at a rotational speed and subjected to a percussion frequency during a boring action, in which the tool is additionally subjected to a force, driving the tool into an object of a given material, comprising:
    determining parameters characterizing an actual operating state of the machine tool;
    conducting an adaptive process analysis based on the determined parameters in order to obtain parameter-specific, relevant characteristics;
    evaluating the parameter-specific, relevant characteristics within a decision-making process in order to obtain information regarding the actual operating state;
    selecting known reference data of the tool describing an operating state and of the to be machined material according to a given quality criterion;
    determining an optimum operating point for the machine tool determinable by a rotational speed and percussion frequency by comparison of the information characterizing an actual operating state with the selected reference data; and
    regulating the machine tool regarding the rotational speed and the percussion frequency based on the determined optimum operating point.

2. The method according to claim 1, wherein the machine tool is a percussion drilling machine which is rotary driven and percussion driven by at least one motor unit and the tool is a drill bit or a drill head.

3. A method according to claim 1, wherein the percussion frequency, the rotational speed, the longitudinal acceleration and/or the transverse acceleration acting on the tool as well as power of the machine tool are determined as the parameters regarding the actual operating state of the machine tool.

4. A method according to claim 1, wherein the parameters regarding the actual operating state of the machine tool are determined by means of sensors and provide sensor signals for further processing.

5. A method according to claim 1, wherein in the adaptive process analysis the determined parameters available as sensor signals are processed using a signal, model and/or a knowledge-based process which operates so that parameter-specific, relevant characteristics are obtained in a characteristic vector.

6. The method according to claim 5, wherein a fuzzy-based limit value analysis, trend analysis and/or spectral or wavelet analysis is utilized as the signal-based process.

7. The method according to claim 5, wherein a Kalman filter is utilized as the model-based process.

8. The method according to claim 5, wherein an expert system is utilized as the knowledge-based process.

9. A method according to claim 1, wherein the parameter-specific, relevant characteristics gathered in a vector represent quantitative variables which are transformed by means of the decision-making process into qualitative information in a form of a linguistic term regarding the actual operating state.

10. A method according to 1, wherein the information regarding the actual operating state comprises a utilized type of tool and type of material.

11. A method according to claim 1, wherein characteristic-based pattern recognition methods working on a basis of a neuro-fuzzy logic are utilized for the decision-making process.

12. A method according to claim 1, wherein reference data in a form of non-linear families of characteristic curves available for selection are determined as a function of the rotational speed and the percussion frequency by means of an empirical series of tests using different tools on different to-be-machined materials according to a fixed quality criterion.

13. The method according to claim 12, wherein maximum boring progress, maximum borehole quality, minimum energy consumption or minimum mechanical strain for a human guiding the machine tool is utilized as the quality criterion.

14. A method according to claim 1, wherein the reference data are present in a form of look-up tables.

15. A method according to claim 1, the comparison of the information regarding actual operating state with selected reference data are conducted to obtain the optimum operating point by means of forming minimum respectively maximum values of the reference data present as a family of characteristic curves, in which comparison search and optimization algorithms are employed.

16. A method according to claim 1, wherein the regulation of the machine tool by comparison of the parameters regarding the actual operating state of the machine tool present in a form of sensor signals with the optimized operating point, which is describable by an optimum rotational speed and an optimum percussion frequency, with regard to the rotational speed and percussion frequency, is conducted so that in an event a deviation is present, the rotational speed and the percussion frequency of the machine tool is readjusted with regard to the optimum operating point.

17. A device for optimized regulation of an operating state of a manually guidable machine tool tool rotating with a rotational speed and subjected to a percussion frequency which is driven with a force into an object of a given material, comprising:

sensors provided on the machine tool, providing sensor signals representative of the rotational speed, the percussion frequency, longitudinal acceleration, and transverse acceleration with regard to the tool and/or electrical power received by the machine tool;

an evaluation unit which evaluates the sensor signals based on a signal-based, model-based and/or knowledge-based process and providing signal characteristics and which analyzes the signal characteristics on a basis of a decision-making process so that information characterizing an actual operating state of the machine tool is obtained;

an optimizing unit which determines an optimum rotational speed and optimum percussion frequency based on empirically gained information and information of regarding the actual operating state of the machine tool; and a comparing and regulating unit which readjusts the machine tool if the determined rotational speed and optimum percussion frequency deviates from the determined optimum rotational speed and percussion frequency in order to obtain an optimized operating state.

* * * * *